April 11, 1961 A. H. ROBSON 2,979,264
AIR HEATER FUEL CONTROL SYSTEM
Filed Sept. 29, 1958

INVENTOR.
AUBREY H. ROBSON
BY
Edward C. Oring
ATTORNEY

United States Patent Office 2,979,264
Patented Apr. 11, 1961

2,979,264

AIR HEATER FUEL CONTROL SYSTEM

Aubrey H. Robson, Rock Island, Ill., assignor to American Air Filter Company, Inc., Louisville, Ky., a corporation of Delaware Filed Sept. 29, 1958, Ser. No. 764,170

4 Claims. (Cl. 236—10)

This invention relates to portable air heaters employing liquid fuel and relates particularly to a fuel control system for such a heater.

Hubbard U.S. Patent 2,758,591, issued August 14, 1956, exemplifies a portable space heater used extensively for supplying heated air for a multitude of purposes. One specific and extensive utilization of such a heater has been as a ground support heater for preheating aircraft and their engines prior to take-off. The present invention is directed to an improved control system for an air heater of this general type.

Since these heaters are used extensively for heating and ventilating aircraft before take-off in various localities, including extremely cold climates, the combustion chamber and other heater structure may become very cold between periods of use. If the heater is initially fired at a high rate, the structure of the heater subjected to substantial temperatures may be damaged by excessive thermal shock.

Such heaters are also operated to service various advanced aircraft which may require substantially different ventilating air temperatures to be delivered thereto. Thus, failure of the heater operator to reset the overheat cut-out means when resetting the ventilating air temperature selector may result in the heater operation being stopped by operation of the overheat cut-out means if the overheat temperature set point is too low relative to the selected temperature. This failure may be serious if it is necessary that the supported aircraft be airborne quickly. Or, failure to reset may result in the differential between the selected air temperature and the overheat temperature being excessive, in which case the overheat means is in effect inoperative.

With the foregoing in mind, it is one object of the present invention to provide a heater control system operative to give a so-called "slow fire start" or minimum burner fire when burner operation is initiated.

Another object is the provision of a control system which requires that the system be in a condition adapted to give minimum burner fire before ignition of fuel occurs.

Another object is the provision of a control system including overheat cut-out means for terminating burner operation when the temperature of the ventilating air discharge from the heater exceeds a selected temperature, the system functioning so that when the overheat cut-out means is actuated, the control system must reset to a condition adapted to support minimum burner fire before normal operation may be restored.

Another object is the provision of a control system in which the overheat cut-out means is integrated with the temperature control selector to obtain a relatively constant differential between the selected ventilating air discharge temperature and the overheat cut-out temperature over the entire temperature selection range.

Still another object is the provision of signal means operative in accordance with the condition of the control system to indicate to the heater operator whether the heater is properly operating and if not, what steps must be taken to restore proper operation.

These and other objects are attained in accordance with the control system of the present invention, which contemplates the provision of a fuel control system wherein starting circuit means are provided to operate the fuel control valve to a position of minimum burner fire upon initial energization of the system. Upon reaching this minimum burner fire position, the fuel control valve is rendered inoperative in a direction to decrease burner fuel flow, and a circuit for initial energization of a relay coil is placed in a condition for energization. Upon energization of this relay, the temperature responsive control circuit for controlling the valve in a normal operation is energized. The invention further contemplates the provision of overheat switch means for rendering the system inoperative in response to an overheat condition, signal means for indicating the operating condition of the system, and means for integrating the overheat circuit with the temperature control circuit to obtain a relatively constant differential between the selected discharge and overheat temperature.

Figure 1:
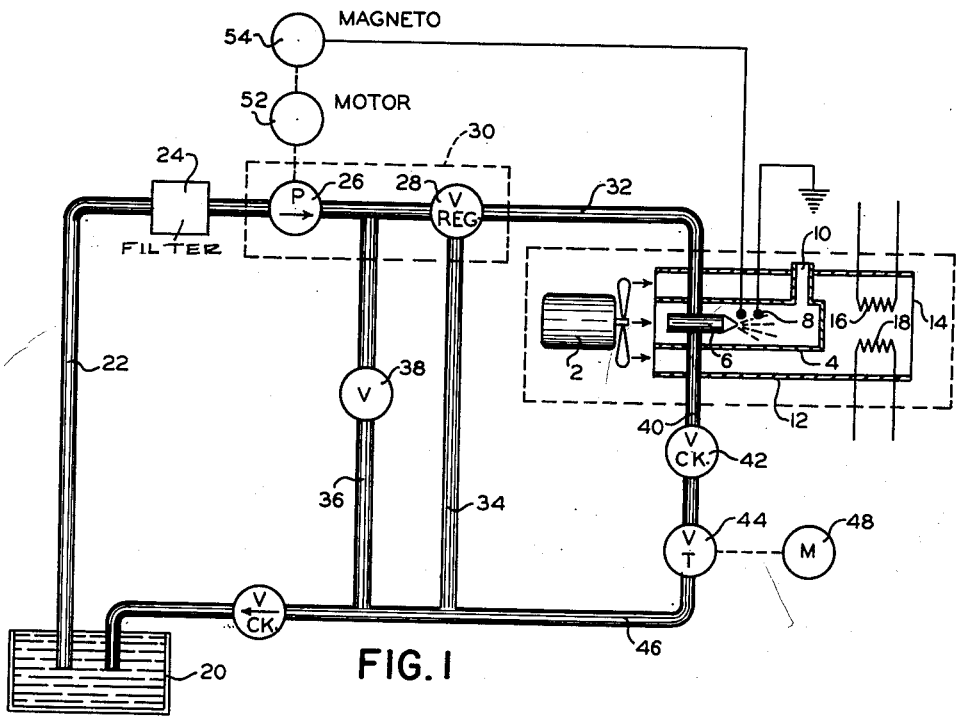
Figure 1 is a diagrammatic view illustrating the heater fuel flow system and certain elements associated therewith for controlling fuel flow and heater operation.

The combustion and air heating system is of the general type illustrated in Hubbard U.S. Patent 2,758,591, issued August 14, 1956, and as shown diagrammatically in Figure 1 comprises: forced air blower means 2 providing ventilating air and combustion air; a combustion chamber or burner 4 adapted to receive combustion air from the blower 2 and liquid fuel from jet nozzle 6, the burner also containing ignition spark electrodes 8 and communicating with an exhaust stack 10 for discharging the exhaust gases; an outer jacket 12 defining a heat exchanging passageway between the combustion chamber and the outer jacket so that ventilating air may be heated in its passage therethrough, the outer jacket terminating in an air outlet 14 through which the ventilating air is discharged into suitable conveying ducts for delivery to the served space; and a temperature control sensing element 16, and a temperature overheat sensing element 18, both of which are associated with Wheatstone bridge circuits to be hereinafter described.

The fuel flow system will now be described. The fuel is drawn from tank 20 through conduit 22 and fuel filter 24 by pump 26. A regulating valve 28 on the discharge side of the pump 26 is a conventional balanced regulating type within housing 30 and is adapted to open and supply fuel at a predetermined pressure to nozzle supply conduit 32. When the regulating valve 28 opens, fuel flows at that predetermined pressure (e.g. 150 p.s.i.) through conduit 32 to nozzle 6. Secondary by-pass conduit 34 returns fuel, in excess of that required to maintain a steady 150 p.s.i. in nozzle conduit 32, back to tank 20. Primary by-pass conduit 36 contains a two position (open-closed) solenoid operated valve 38 which, for purposes of explanation herein, is held in a closed position by energization of its solenoid coincidentally with energization of the discharge air temperature control circuit so that no fuel is by-passed therethrough back to tank 20. When the solenoid for valve 38 is de-energized, valve 38 is open, fuel by-passes back to the tank 20 through primary by-pass line 36, and regulating valve 28 is in a closed position preventing fuel flow to the nozzle supply line 32.

The burner nozzle 6 is of the by-pass type which permits an operation wherein the rate of fuel discharged into the burner through nozzle 6 is controlled by throttling on the downstream side of the nozzle. Such a burner nozzle is illustrated and described in Hubbard U.S. Patent 2,758,591 and includes a supply chamber into which fuel from conduit 32 flows, a combustion jet orifice through which some of the fuel escapes as a spray or jet into the burner, and a by-pass chamber which receives the rest of the fuel. With fuel supplied by conduit 32 at a constant pressure to the nozzle, part of the fuel will be discharged through the jet orifice into the burner chamber and part of it will by-pass to the by-pass chamber. The by-pass chamber connects to the nozzle by-pass conduit 40 which contains a check valve 42 and a throttling valve 44. Thus, in operation, the more the nozzle by-pass conduit is throttled by valve 44, the more fuel is discharged through the nozzle jet orifice; and conversely, the less the jet by-pass conduit is throttled, the less fuel issues through the nozzle jet orifice. The downstream side of the throttling valve 44 is connected to pass excess fuel back to the tank 20 through return conduit 46. The throttling valve 44 is modulated between end travel limits by reversible motor 48 which, in turn, is controlled in a manner to be described hereinafter.

The fuel pump 26 is driven by electric motor 52 which also drives the ignition magneto 54 electrically connected to supply power for the igniting spark between electrodes 8 at the nozzle orifice. This insures an igniting arc at the nozzle at all times that the fuel pump is operating.

Figure 2:
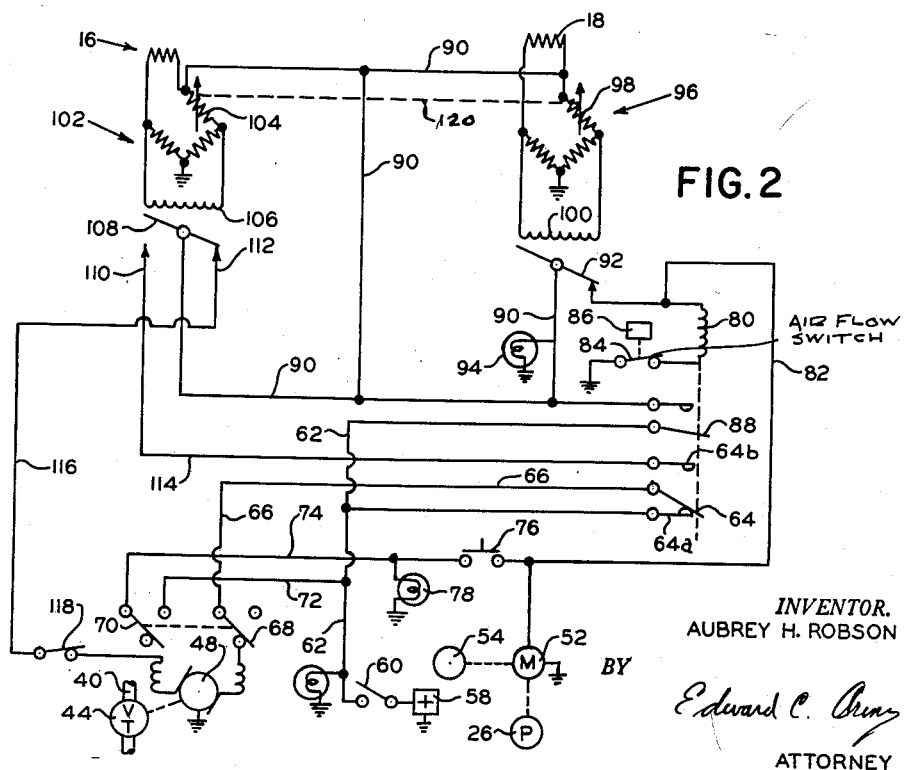
Figure 2 is a diagram of an electrical circuit for controlling that part of heater operation to which this invention is directed.

Referring now to Figure 2, 58 is a suitable power source connected to one side of main switch 60 which is closed to initiate energization of the circuit. Upon closure of switch 60 power is delivered to the valve opening winding side of throttling valve motor 48 through a starting circuit including line 62, relay actuated, double-throw switch 64, line 66 and motor limit switch 68. With the valve opening winding of the motor 48 energized, the motor 48 moves throttle valve 44 to its maximum open position which corresponds to a minimum discharge of fuel from the nozzle 6. When motor 48 reaches its end travel position, limit switch 68 is actuated from its illustrated position in Figure 2 to its opposite or open position which opens the starting circuit to the valve opening winding of the motor 48.

Auxiliary limit switch 70, which is linked to switch 68 so that it operates therewith, is moved to its alternate or closed position when limit switch 68 is opened. Closure of switch 70 completes a portion of a holding relay circuit which partly includes line 72, switch 70, and line 74 connected to one side of normally-open, manually-closable or push button switch 76. Energization of this portion of the holding relay circuit causes lamp 78 to be illuminated, thus indicating to the operator of the heater that motor 48 has driven valve 44 to a minimum flame position and that push button switch 76 should be closed to energize the rest of the circuit.

Upon closing switch 76, pump-ignition magneto drive motor 52 is energized, and relay winding 80 is energized through line 82. Relay winding 80 is connected to ground through switch 84 which is maintained in a closed position by combustion air responsive element 86 as long as there is combustion air flow. Upon energization of relay winding 80, relay actuated switch 64 is operated from its 64a to its 64b contact to open the starting circuit and simultaneously complete the normally operative temperature responsive control circuit.

Energization of relay 80 also serves to complete a parallel holding relay circuit including line 62, relay actuated switch 88, line 90 and overheat cut-out switch 92 so that push button switch 76 may be released. Closure of switch 88 also results in indicating lamp 94 being illuminated, thus signalling the operator that the air heater temperature responsive control system is energized for normal operation.

The overheat cut-out switch 92 is controlled by a Wheatstone bridge circuit 96 which includes a duct sensing element 18 electrically connected in one leg of the bridge but physically located in the ventilating air outlet of the heater, and a variable resistor 98 serving as the overheat selection resistor in another leg of the bridge. Polarized relay winding 100 is connected to the output terminals of the bridge 96 and controls the operation of overheat cut-out switch 92. Since bridge 96 is energized through line 90, it will be energized when relay 80 is energized to close switch 88. The operation of the bridge is essentially conventional in that while the ventilation air outlet temperature sensed by resistor 18 does not exceed the selected temperature corresponding to the selected resistance of resistor 98, current flow through winding 100 will be in a direction to maintain switch 92 closed. When the air outlet temperature sensed by resistor 18 exceeds the selected cut-out temperature established by adjusting resistor 98, current flow through the bridge will be in the opposite direction and switch 92 will open and thereby de-energize relay 80.

Wheatstone bridge 102 is the temperature control bridge and, as with bridge 96, derives its power from line 90. It includes a temperature selecting variable resistor 104 in one leg, and a ventilating air temperature sensing resistor 16 in another leg. Polarized relay winding 106 is connected to the output terminals of the bridge 102 and controls the operation of switch 108. Current flow through winding 106 in one direction or the other occurs in response to the differential in resistance between the resistor 16 (which is a function of the temperature sensed by it), and resistor 104 (which is manually adjusted to a resistance setting corresponding to the desired temperature). When the temperature sensed by the resistance 16 exceeds the selected temperature established by resistor 104 the current through winding 106 will flow in a direction to cause the polarized relay switch 108 to be moved towards the valve opening contact 110. Conversely, when the temperature sensed by resistor 16 is below the selected temperature established by resistor 104, the current flow in an opposite direction through polarized relay winding 106, and polarized relay switch 108 will move towards the valve closing contact 112.

Closure of switch 108 to valve opening contact 110 results in energization of motor 48 in a valve opening direction through one side of the temperature responsive control circuit, which includes line 114, switch 64, line 66 and limit switch 68. Closure of switch 108 to valve closing contact 112 results in energization of motor 48 in a heating direction through the other side of the temperature responsive control circuit, which includes line 116 and motor limit switch 118. Limit switch 118 opens only when the motor 48 reaches its end travel limit corresponding to valve 44 being in a maximum closed position.

Since power for operating motor 48 in either direction is obtained from line 90 in normal temperature control operation, and line 90 is energized through closure of switch 88, it will be apparent that opening of overheat cut-out switch 92 serves, through de-energization of relay winding 80 and opening of switch 88, to remove control of motor 48 from the temperature control bridge 102. It is also to be noted that the bridge circuits 96 and 102 conventionally include certain adjusting and calibrating elements which have been omitted for clarity.

In accordance with one feature of this invention, the temperature selection resistor 104 and overheat selection resistor 98 are linked by conventional mechanical means such a ganging both resistors or rheostats on a single shaft (indicated schematically in Figure 2 by the dotted line 120) so that they are adjusted simultaneously through the medium of a single adjusting knob. Thus, the differential (e.g. 25° F.) between the desired temperature and overheat temperature remains relatively constant throughout the temperature range.

Operation

The operation of the heater and control system will now be outlined. It is assumed for this purpose that the heater has not been operated for a period of time, that the temperature selection resistor 104 and overheat selection resistor 96 are set to a desired intermediate temperature such as 120° F., that switch 108 is contacting neither valve opening contact 110 nor valve closing contact 112, and that motor 48 is in an intermediate position so that both limit switches 68 and 118 are closed.

The blower means 2 is energized by a conventional circuit, thus effecting closure of combustion air switch 84 through air flow responsive element 86.

Main power switch 60 is closed and the valve opening winding of motor 48 is energized to drive throttle valve 44 to its maximum open (minimum fuel to burner) position. When motor 48 reaches its end travel limit, switches 68 and 70 operate to alternate positions so that motor 48 is deenergized and lamp 48 is illuminated to signal the heater operator that switch 76 should be momentarily closed.

Closure of switch 76 simultaneously energizes pump-ignition motor 52 and relay winding 80. Motor 52 drives fuel pump 26 and ignition magneto 54 so that fuel flows to the nozzle 6 and that fuel discharged into the burner is ignited by electrodes 8. With throttle valve 44 having been driven to maximum open position, the fuel discarge from the nozzle is at the lowest flame supporting rate. This minimizes thermal shock to the burner and combustion chamber structure.

As noted, the energization of relay winding 80 actuates switch 64 to its 64b position and closes switch 88, thereby maintaining relay winding 80 energized through the overheat cutout switch 92, which is closed since the ventilating air is obviously not overheated when operation begins. The bridge circuits 96 and 102 are energized through line 90 when switch 88 is closed, and power to operate motor 48 upon closure of temperature control switch 108 is simultaneously provided. Thus, it will be apparent that momentary closure of manually operated switch 76 energizes the fuel control system for normal operation.

Since the initial ventilating air outlet temperature sensed by element 16 is much lower than the desired temperature established by selection resistor 104, the current flow through polarized relay winding 106 will be in a direction to close switch 108 to valve closing contact 112. This causes motor 48 to operate in a direction tending to close throttle valve 44 and thereby decreasing by-pass fuel flow and increasing fuel discharge into the burner. Operation of the motor 48 away from its valve open end travel limit closes switch 68 and opens switch 70. This permits the motor 48 to be energized in a valve opening direction when called for by bridge 102 and in response to closure of switch 108 to valve opening contact 110. It also extinguishes lamp 78. Observation by the operator that lamp 94 is lighted and lamp 78 is extinguished thus indicates to the operator that the system is energized for normal operation.

Motor 48 will modulate valve 44 in one direction or another in response to closure of switch 108 to contact 110 or 112. Since switch 108 is biased to a neutral position when the bridge 102 is balanced, motor 48 will be de-energized when the ventilating air outlet temperature is relatively close to the selected temperature.

If the outlet temperature exceeds the selected overheat temperature, switch 92 will open, relay winding 80 will be de-energized, and switches 64 and 88 will operate to the positions shown in Figure 2. Thus, lamp 94 will be extinguished, motor 52 will be de-energized and both bridges 96 and 102 will be de-energized. Motor 48 will automatically be driven to the end position wherein valve 44 is at its maximum open position for minimum nozzle discharge. When motor 48 reaches this end travel position, switches 68 and 70 are actuated, lamp 78 is lighted, and the operator may close switch 76 to restore normal operation.

It will be noted that as soon as overheat occurs, the ignition magneto 54 and fuel pump 26 are rendered inoperative and burner fire is terminated until the slow fire start position of valve 44 is reached and switch 76 is manually closed.

If the selected temperature established by resistor 104 is only slightly above that obtainable with a minimum fuel flow into the burner, it is possible that during the normal hunting of the temperature responsive control circuit, limit switch 68 will be opened and auxiliary limit switch 70 will be closed by movement of motor 48 to its corresponding end travel limit. This is not detrimental to normal operation since it only results in lamp 78 being illuminated.

By placing the combustion air responsive switch 84 in series with the relay 80, the relay cannot be energized unless combustion air is flowing. Thus, if the lamp 94 does not remain illuminated after the operator releases push button switch 76, it will be immediately apparent that there is no combustion air flow.

Having described my invention, I claim:

1. In an air heater of the type having a liquid fuel burner into which fuel is discharged at a rate inversely proportional to the degree to which a fuel return conduit connected to said burner is throttled by a throttling valve therein, a fuel control system including: fuel supply means; a source of electrical power; motorized means for operating said throttling valve; circuit means connecting said motorized means for energization in a valve throttling direction or in an opposite valve opening direction in response to variations in heater discharge air temperatures during operation of said heater after starting; heater discharge air temperature control means including switch means in said motorized means circuit responsive to a departure in temperature of said heater discharge air above a selected temperature range to energize said motorized means in a valve opening direction, and responsive to a departure in temperature of said heater discharge air below said selected temperature range to energize said motorized means in a valve throttling direction, said switch means being biased to a neutral position so that said motorized means will be de-energized so long as said heater discharge air temperature is within said selected temperature range; a relay having an actuating coil and first and second associated switches controlled by said coil, said first relay switch in its actuated position completing a portion of said motorized means circuit; a starting circuit connected to said source of power and including said first relay switch in its non-actuated position for energizing said motorized means in a valve opening direction, said starting circuit including a first limit switch operable to an open position in response to operation of said motorized means to a position corresponding to a fully open valve position; an initial energizing circuit for said relay coil including a second limit switch operable to a closed position simultaneously with operation of said first limit switch to said open position; circuit means responsive to a temperature of said heater discharge air above a selected overheat temperature to actuate an overheat cutout switch to an open position; a holding circuit for maintaining said relay coil energized after initial energization of said relay coil by said initial energizing circuit, said holding circuit including in series said second relay switch in its actuated position and said overheat cut-out switch in its non-actuated position; a circuit connecting said air temperature responsive switch means to said source of power through said second relay switch in its actuated position so that said motorized means is prevented from being operated in a throttling direction in response to a heater discharge air temperature below said selected temperature range until said motorized means has first been operated to a position corresponding to a fully open valve position; and circuit means for operating said fuel supply means, said circuit means being connected to be energized to supply fuel to said burner only after said throttling valve has been operated to said fully open position.

2. The air heater of claim 1 wherein: said heater discharge air temperature control means includes bridge circuit means for controlling operation of said switch means, said bridge circuit including a variable discharge air temperature range selection element; said overheat temperature circuit means includes a bridge circuit for actuating said overheat cut-out switch, said latter bridge circuit including a variable overheat temperature selection element; both of said bridge circuits are connected to be energized simultaneously with said holding circuit; and means are provided to link said elements for simultaneous adjustment to obtain a relatively constant differential between said selected discharge air temperature range and said selected overheat temperature.

3. The air heater of claim 2 wherein: said initial energizing circuit includes a manually closable, normally open switch in series with said second limit switch.

4. The air heater of claim 3 including: first signal means connected to the power side of said manually closable switch to provide a signal upon closure of said second limit switch; and second signal means connected to said holding circuit to provide a signal when said holding circuit is energized.

References Cited in the file of this patent

UNITED STATES PATENTS 2,816,605     Seville _____ Dec. 17, 1957